Dec. 18, 1962    S. ROSEN    3,069,178
SEALING ARRANGEMENT FOR A PUMP
Filed Sept. 22, 1959

SIDNEY ROSEN
INVENTOR.

BY Walter G. Finch
ATTORNEY

United States Patent Office 3,069,178
Patented Dec. 18, 1962

3,069,178
SEALING ARRANGEMENT FOR A PUMP
Sidney Rosen, 4119 Fordleigh Road, Baltimore 15, Md.
Filed Sept. 22, 1959, Ser. No. 841,642
1 Claim. (Cl. 277—112)

This invention relates generally to pressure sealing devices, and more particularly it pertains to a new and unique sealing arrangement for use in reciprocation type pumps, or in other devices or apparatus requiring a sealing arrangement between moving parts.

It is an object of this invention to provide a unique sealing arrangement for sealing the peripheral opening between a piston rod and the wall encompassing the piston rod.

Still another object of this invention is to provide a new type of sealing arrangement in which Teflon or other similar resilient synthetic plastic type of sealing elements are used.

And to provide a sealing arrangement for a pump which is simple in construction, economical to manufacture, and efficient and reliable in operational use, are other objects of this invention.

And still another object of this invention is to provide a sealing arrangement in which additional means are provided for adjusting the distance between the sealing elements caused by wear thereof or changes in temperature of the environmental structure.

Figure 1:
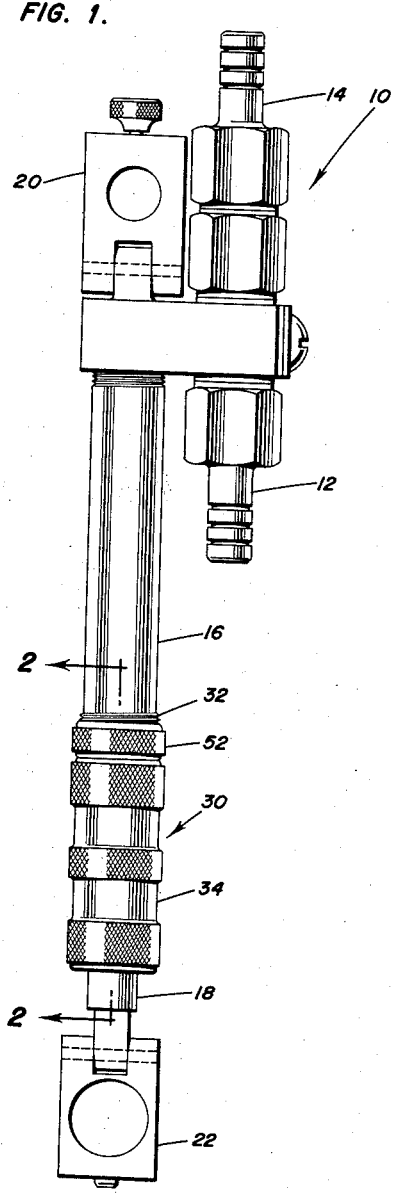
Figure 2:
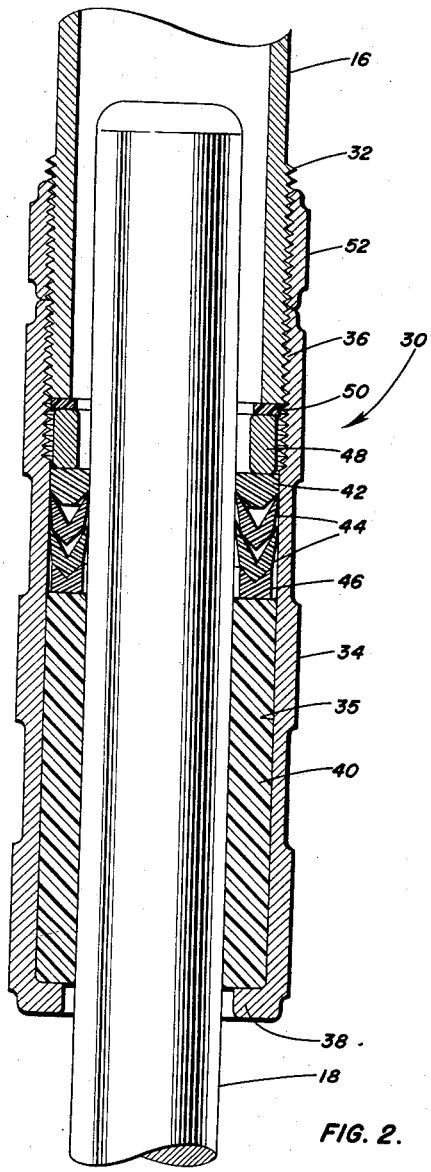

Other objects and advantages of this invention will become more apparent from the following specification and accompanying drawing in which:

FIG. 1 is a side elevation of a pump incorporating a sealing arrangement having features of this invention; and
FIG. 2 is a cross-section taken along line 2—2 of FIG. 1.

Referring now to FIG. 1 of the drawing, there is shown a pump which is indicated generally by reference numeral 10, which incorporates the sealing arrangement 30 having features of this invention.

Pump 10 is provided with an inlet or intake 12 for a fluid which is to be pumped under pressure into a container (not shown) through the outlet 14. Normally, pump 10 is used to pump high viscous type fluids, although low viscous type fluids can be pumped by it.

The pump 10 is provided with a tube 16 which can act as the pump body cylinder for receiving a reciprocating piston 18 therein. Pump 10 is also provided with an upper fitting 20 and a lower fitting 22.

The pump 10 oscillates about the axis of a shaft (not shown) which passes through the aperture in the upper fitting 20 when the lower fitting 22 is driven by an eccentric crank (not shown) inserted in the aperture in the lower fitting 22 so as to move the piston rod 18 back and forth in its cylinder tube 16 so as to pump the fluid drawn into the pump 10 through the intake 12 through the outlet 14.

The previously mentioned sealing arrangement 30 for the piston rod 18 of the pump 10 consists of a cylindrical sleeve 34 which is internally threaded by threads 36 at its upper end. The remaining internal surface 35 of the sleeve 34 is cylindrical and unbroken. The threads 36 of the sleeve 34 engage the threads 32 on the threaded lower end of cylinder tube 16 of the pump 10. A lock ring 52 is also threaded on the threads 32 of the cylinder tube 16 to lock the sleeve in a fixed position, as will be described subsequently.

Sleeve 34, as best shown in FIG. 2, is provided with a shoulder 38 through which the piston rod 18 passes. A cylindrical sleeve bearing 40 is provided at the shoulder end of the sleeve 34. This type of bearing 40 is often referred to as the conventional "Oilite" bearing, and it is used with the pumping of viscous fluids. However, if milk or a like fluid is to be pumped by pump 10, a specially processed Teflon bearing can be substituted therefor.

At the upper end of the bearing 40, there is provided an annular Teflon male adapter ring 46, a plurality of annular V-shaped packing rings 44, and a Teflon female adapter ring 42, followed by a spacer 48. A Teflon gasket 50 is positioned between the end of the cylinder tube 16 and the spacer 48, as shown in FIG. 2.

All of the adapter rings 42 and 46, packing rings 44, spacer 48 and gasket 50 as well as the bearing 40 are of annular shape, with the bearing 40, Teflon male adapter ring 42, and the inner edges of the packing rings being arranged to engage the external or outer surface of the piston rod 18. The female adapter ring 46, spacer 48, and gasket 50 are designed with inner diameters which are greater than the outer diameter of the piston rod 18.

The V-shaped packing rings 44 are preferably formed of Teflon or similar resilient synthetic plastic material, and they are used to form a high pressure sealing arrangement between the reciprocating piston 18 and the cylinder tube 16 so as to prevent the leakage of fluid under pressure from the cylinder 16 of the pump 10. It is to be noted that these packing rings 44 are formed with sharp or knife edges which bear against the outer surfaces of the moving piston 18.

In operational use, the packaging and sealing arrangement 30 is installed as shown in FIG. 2, with the knife edges or lips of the packing rings 44 in engagement with the surface of the piston rod 18.

In the event the packing rings 44 should wear at their knife edges or lips, then the locking ring 52 is loosened and the sleeve 34 is adjusted on the threaded end of the cylinder tube 16 to cause the knife edges or lips of the rings to expand and be positioned adjacent the surface of the piston rod 16.

On the other hand, if there are changes in the environmental temperature of the pump 10 caused by the fluid being pumped, the packing rings 44 will either expand or contract. Thus, the sleeve 34 can be adjusted either to expand or contract the packing rings 44 as required and thus effect a good sealing arrangement between the cylinder tube 16 and its piston rod 18.

Obviously, many modifications and variations of the present invention are possible in light of the above teachings. It is, therefore, to be understood that within the scope of the appended claim, the invention may be practiced otherwise than as specifically described.

What is claimed is:

In combination, a pump assembly having a housing, a piston with a piston rod adapted to reciprocate within said housing for pumping fluids, said housing consisting of an upper cylindrical portion having an exterior thread at one end, a lower cylindrical portion having an internal thread at one end for threadably receiving the threaded end of said upper cylindrical portion, and a lock nut mounted upon the threaded end of said upper cylindrical portion and adapted to tighten against the threaded end of the lower cylindrical portion of said housing after said cylindrical portions are assembled, means at the end opposite the threaded end of said upper cylindrical portion through which fluid is received and discharged, the end opposite the threaded end of said lower cylindrical portion having an opening and containing a sleeve bearing both for slidably receiving said piston rod which extends partly within and without said lower cylindrical portion which forms the lower part of said housing, a plurality of substantially V-shaped solid resilient synthetic plastic annular packing rings having a low coefficient of friction surrounding said piston for sealing an annular opening between said housing and said piston, each said V-shaped packing ring having a substantially wedge shaped apex portion with a pair of leg portions extending therefrom to tapering knife edges for engaging the walls of said housing and said piston when wedging forces are exerted upon said packing rings, the angle formed by said apex portion being greater than the angle formed between said pair of leg portions and the width across said apex portion being less than the width across the knife edges of said pair of leg portions, said packing rings being nested and arranged in tandem with the wedge apex portion of one packing ring being received between the pair of leg portions of the adjacent packing ring and forming an annular chamber therebetween, a male adapter ring, a female adapter ring, said male and female adapter rings being positioned on opposite sides of said packing rings and mating with their respective packing rings, said male adapter ring lying in-line with and adjacent to said sleeve bearing, a spacer ring and a gasket lying in-line with and adjacent to said female adapter ring, all said packing rings, adapter rings, spacer ring, and gasket being contained within the lower cylindrical portion of said housing, said gasket contacting the lower edge of the threaded end of the upper cylindrical portion of said housing, whereby when the lower cylindrical portion of said housing is rotated relative to the upper cylindrical portion thereof causing telescoping of said upper portion into said lower portion, pressure is transmitted through said bushing and spacer ring to said adapter rings and packing rings to cause expansion of the legs of each packing ring against said piston and the inner wall of said housing by wedging action of each wedge shaped apex portion entering the annular chamber of its respective pair of mating legs of an adjacent packing ring.

References Cited in the file of this patent
UNITED STATES PATENTS

| | | |
|---|---|---|
| 1,246,089 | Greenoe | Nov. 13, 1917 |
| 1,292,392 | Esnault-Pelterie | Jan. 21, 1919 |
| 1,968,650 | Mastin | July 31, 1934 |
| 2,267,183 | Williams | Dec. 23, 1941 |
| 2,312,430 | Magnuson | Mar. 2, 1943 |
| 2,430,836 | Taylor | Nov. 11, 1947 |
| 2,464,347 | Roofe | Mar. 15, 1949 |
| 2,684,262 | Neesen | July 20, 1954 |
| 2,765,185 | Mott | Oct. 2, 1956 |
| 2,839,318 | Ackermann | June 17, 1958 |